(12) United States Patent
McConn et al.

(10) Patent No.: US 10,112,523 B2
(45) Date of Patent: Oct. 30, 2018

(54) WEIGHT DISTRIBUTING TRAILER HITCH INSTALLATION AND STORAGE DOLLY

(71) Applicants: James Patrick McConn, Torrance, CA (US); Barbara Jean McConn, Torrance, CA (US)

(72) Inventors: James Patrick McConn, Torrance, CA (US); Barbara Jean McConn, Torrance, CA (US)

( * ) Notice: Subject to any disclaimer, the term of this patent is extended or adjusted under 35 U.S.C. 154(b) by 194 days.

(21) Appl. No.: 15/163,506

(22) Filed: May 24, 2016

(65) Prior Publication Data

US 2017/0106778 A1   Apr. 20, 2017

Related U.S. Application Data

(60) Provisional application No. 62/241,693, filed on Oct. 14, 2015.

(51) Int. Cl.
| | |
|---|---|
| *B62B 1/26* | (2006.01) |
| *B62B 1/06* | (2006.01) |
| *B62D 53/08* | (2006.01) |
| *B60P 3/073* | (2006.01) |
| *B60P 3/10* | (2006.01) |
| *B60P 3/36* | (2006.01) |

(52) U.S. Cl.
CPC ............. *B60P 3/073* (2013.01); *B60P 3/1083* (2013.01); *B60P 3/36* (2013.01); *B62B 1/06* (2013.01); *B62B 1/26* (2013.01); *B62D 53/0857* (2013.01)

(58) Field of Classification Search
CPC ........... B60D 1/247; B62B 1/247; B62B 1/06; B62B 1/08; B62B 1/125; B62B 1/047; B62B 1/22; B62B 2203/10; B62B 2203/48; B62B 1/14; B62B 1/26; B66F 5/025; B66F 5/02; B66F 7/04; B62D 53/0857; B62D 53/0864
USPC ............ 280/35, 457, 456.1, 476.1, 512, 513
See application file for complete search history.

(56) References Cited

U.S. PATENT DOCUMENTS

| | | |
|---|---|---|
| 1,868,891 A | 7/1932 | Faudi |
| 2,166,208 A | 7/1939 | St. John |

(Continued)

FOREIGN PATENT DOCUMENTS

GB   2275231   * 8/1994

*Primary Examiner* — Anne Marie M Boehler

(57) ABSTRACT

The weight distributing trailer hitch installation and storage dolly is designed to store and transport to and from a tow receiver all, but not limited to, the common weight distributing trailer hitch components listed here—the hitch-head assembly, comprised of the shank and the hitch-head with connecting balls installed, the spring bars, the sway control brake(s), and the spring tension adjusting tool. At the to receiver the weight distributing trailer hitch installation and storage dolly enables the operator to raise or lower the hitch-head assembly with spring bars attached and adjust the horizontal and vertical angles to match those of the hitch receiver of the tow receiver. The shank of the hitch-head assembly can then be inserted and secured into the hitch receiver of the tow receiver. The weight distributing trailer hitch installation and storage dolly can then be released and rolled out of the way. With the tow receiver coupled to the trailer, the spring bars can be tensioned and the sway brake(s) installed. The process is reversed at the other end of the trip. All done safely, easily, and without manually lifting or carrying heavy parts.

19 Claims, 5 Drawing Sheets

(56) References Cited

U.S. PATENT DOCUMENTS

| | | | | |
|---|---|---|---|---|
| 2,793,881 A | * | 5/1957 | Albritton | B60D 1/065 |
| | | | | 280/475 |
| 3,582,043 A | * | 6/1971 | Tranchero | B66F 7/04 |
| | | | | 254/2 R |
| 4,241,936 A | | 12/1980 | Carruthers | |
| 4,804,162 A | * | 2/1989 | Rice | B25H 1/0007 |
| | | | | 248/129 |
| 5,549,287 A | | 8/1996 | Loucks | |
| 5,779,252 A | * | 7/1998 | Bolton, Jr. | B62B 3/02 |
| | | | | 280/35 |
| 5,915,742 A | * | 6/1999 | Hung | B25B 11/02 |
| | | | | 269/17 |
| 6,820,887 B1 | | 11/2004 | Riggle | |
| 8,235,411 B2 | | 8/2012 | Works | |
| 8,251,379 B2 | * | 8/2012 | Watzke | B62B 1/125 |
| | | | | 280/35 |
| 8,517,401 B1 | * | 8/2013 | Horn | B62B 5/0089 |
| | | | | 280/47.15 |
| 8,770,561 B2 | | 7/2014 | Gagnon | |
| 9,050,720 B2 | | 6/2015 | Melvin | |
| 9,186,941 B1 | | 11/2015 | Cramer | |
| 2008/0048161 A1 | * | 2/2008 | Meyer | B66F 3/12 |
| | | | | 254/2 R |
| 2009/0184217 A1 | * | 7/2009 | Sprout | B05B 13/0285 |
| | | | | 248/124.1 |
| 2014/0252194 A1 | * | 9/2014 | Hopkins | B62D 53/0857 |
| | | | | 248/354.5 |

\* cited by examiner

WEIGHT DISTRIBUTING TRAILER HITCH INSTALLATION AND STORAGE DOLLY

RELATED APPLICATIONS

This application is related to provisional patent application, entitled, Weight Distributing Trailer Hitch Installation and Storage Dolly, U.S. Ser. No. 62/241,693, filed on 14 Oct. 2015, under 35 USC 119, which is incorporated herein by reference.

BACKGROUND

Field of the Technology

The invention relates to the field of transport or storage device more specifically devices assisting manual conveyance of articles over short distances, and devices for moving or tilting heavy loads, namely CPC B65G7/12. It also relates to the field of vehicle connections, more specifically traction couplings, hitches, draw-gear, towing devices and auxiliary devices, namely CPC B60D1/58.

Description of the Prior Art

Many challenges are presented by the use of a weight distributing trailer hitch, including, but not limited to, the physical effort of carrying, transporting, and installing the hitch-head assembly. Due to its weight, and the articulating design of the spring bars which tend to splay out awkwardly, carrying the hitch-head assembly and inserting the shank into the vehicle receiver can be challenging. In addition to the strength and effort required to carry the components of a weight distributing hitch assembly, retrieving the hitch-head assembly, spring bars, sway control brake(s), and spring tension adjusting handle requires multiple trips. These challenges present potential problems, especially for those in the fast-growing, aging recreational vehicle community.

BRIEF SUMMARY

The weight distributing trailer hitch installation and storage dolly enables the user to easily store and transport a weight distributing trailer hitch, including, but not limited to, the hitch-head assembly, spring bars, sway control brake(s), and spring tension adjusting tool to or from a tow vehicle in one trip without lifting or carrying. The average weight of an assembly with all accompanying parts is about 75 pounds. The weight distributing trailer hitch installation and storage dolly's three-wheel, low profile frame, supporting a height adjustment mechanism, enables the hitch-head assembly, with spring bars attached, to be raised or lowered to engage with the tow vehicle receiver.

With the hitch-head assembly shank inserted in the receiver, the weight distributing trailer hitch installation and storage dolly is disconnected and rolled out of the way. Once the tow vehicle is coupled to the trailer, the spring bars can be tensioned and the sway control brake(s) retrieved from the weight distributing trailer hitch installation and storage dolly and installed. To remove and store a weight distributing trailer hitch using the weight distributing trailer hitch installation and storage dolly the procedure is reversed.

Therefore, it can readily be understood that the illustrated embodiments of the invention include an adjustable, portable hitch assembly holder for handling a hitch assembly unit comprising: a wheeled base having a front and a rear; a vertically adjustable support leg extending upwardly from the front of the base, the vertically adjustable support leg having a bottom and a top; a hitch ball receiver extending horizontally from the top of the vertically adjustable support leg for receiving the hitch assembly unit; and an adjustable handle extending upwardly from the base and diagonally toward the rear of the base. The hitch assembly holder includes a vertically adjustable stirrup extending upwardly from the wheeled base for receiving and positioning the spring bars of a hitch assembly unit. The wheeled base includes a plurality of wheels for mobility and portability.

The vertically adjustable support leg that extends upwardly from the base comprises a telescopic support leg. The telescopic support leg comprises means for raising and lowering the hitch ball receiver. The telescopic support leg further comprises locking means for selectively fixing a vertical height of the telescopic support leg. The telescopic support leg is comprised of at least two segments of telescopically assembled square steel tubing.

The adjustable handle of the hitch assembly holder comprises a telescopic handle. The telescopic handle has a length and further comprises locking means for selectively fixing the length of the telescopic handle. The adjustable handle comprises a T-shaped adjustable handle having a handle bar, which handle bar also serves as a sheath for holding and storing a spring tension adjusting tool, for use on the hitch assembly unit.

The hitch assembly holder may be used in combination with a plurality of hitch balls, each hitch ball having a corresponding one of a plurality of different sizes, and each hitch ball having a corresponding stem. The hitch ball receiver comprises a top plate having a front and rear with a slot defined therein to accept the corresponding stem of any one of the plurality of hitch balls. The the hitch ball receiver comprises a top plate whereon a ball is pivotally coupled to the rear of the top plate, the ball rotating forward over the hitch ball when disposed in the slot, to retain the hitch ball in the slot of the top plate.

The hitch assembly holder further comprises an extension spring, wherein the wheeled base is comprised of at least two telescopically coupled sections connected by the extension spring, where the two telescopically coupled sections are adjustable to accommodate different sizes of the at least one spring bar of the hitch assembly in the stirrup, while the extension spring allows telescopic adjustment of the two sections of the wheeled base to secure the hitch ball into the slot of the top plate by latching with the ball under spring tension.

The wheeled base further comprises two posts on the front of the wheeled base, one on either side of the wheeled base, that can support the front or rear sockets of two sway control brakes, and two posts on the rear of the wheeled base, one on either side of the wheeled base, that can support the front or rear sockets of two sway control brakes. The wheeled base comprises means for extending and contracting the wheeled base to different lend accommodate hitch assemblies of different sizes.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claim under the judicial doctrine of equivalents and in the case where the claims are expressly formulated under 35 USC 112 are to be accorded full statutory equivalents under 35 USC 112. The disclosure can be better visualized by turning now to the following drawings wherein like elements are referenced by like numerals.

The disclosure and its various embodiments can now be better understood by turning to the following detailed description of the preferred embodiments which are presented as illustrated examples of the embodiments defined in the claims. It is expressly understood that the embodiments as defined by the claims may be broader than the illustrated embodiments described below.

DETAILED DESCRIPTION OF THE PREFERRED EMBODIMENTS

Figure 1:
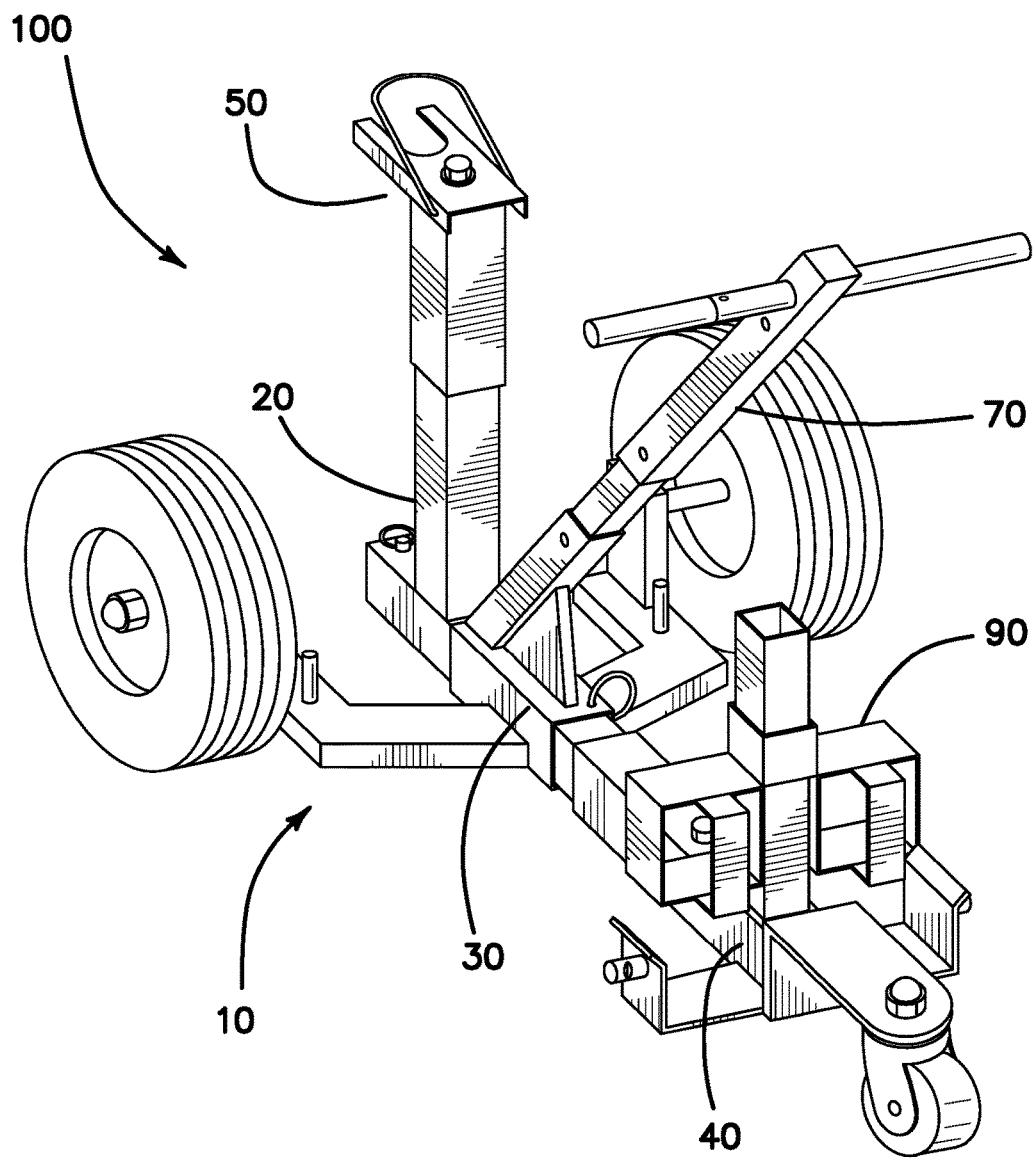
FIG. 1 is a perspective view of the weight distributing trailer hitch installation and storage dolly of the illustrated embodiment of the present invention.

FIG. 1 shows the weight distributing trailer hitch installation and storage dolly, generally denoted by reference numeral 100 in its entire present form. The overall structure of dolly 100 can be seen in FIG. 1 to include a frame as comprised of three square hollow steel sections 20, 30 and 40. Extending upwardly from the front section 20 of the frame is a hitch ball receiver 50 that accepts a weight distributing hitch. The middle section 30 of the frame is the wishbone section. Extending upwardly from the wishbone section 30 is a handle 70 that is used to facilitate installation, transportation, and storage of the weight distributing hitch. Section 40 of the weight distributing trailer hitch installation and storage dolly is the rear section of the frame. Extending upwardly from the rear section 40 of the frame is a stirrup 90 that receives the spring bars of a weight distributing trailer hitch assembly.

Figure 2:
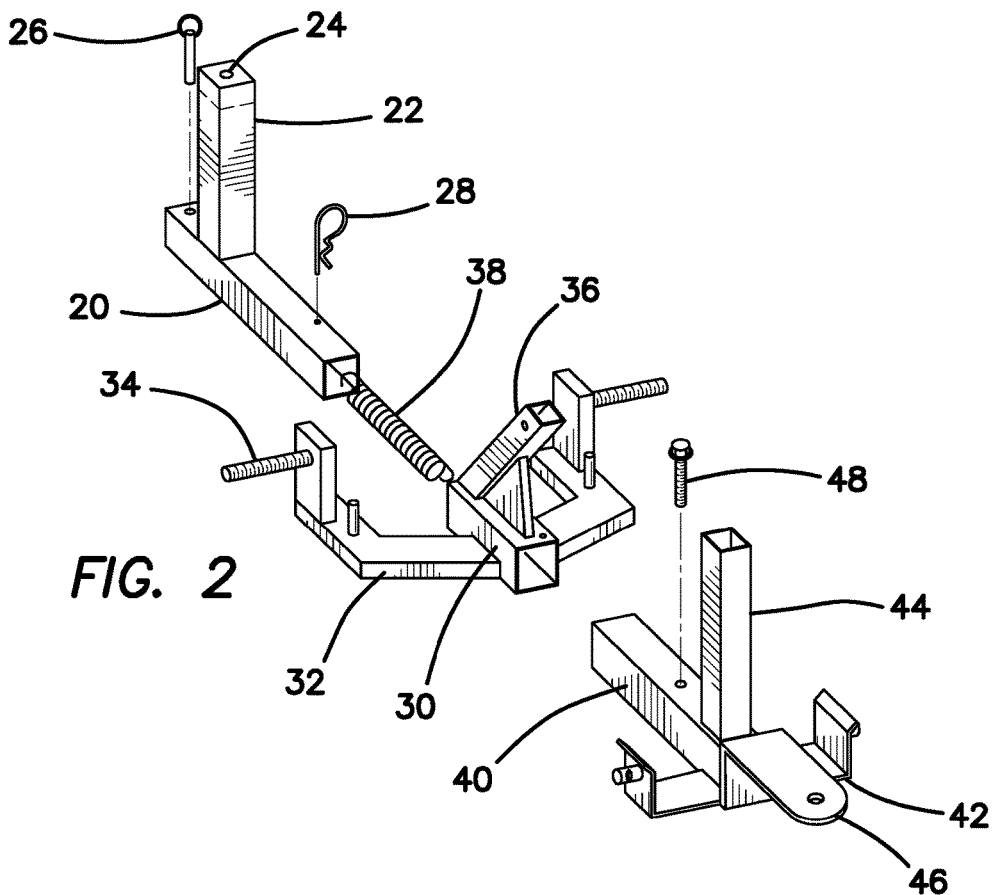
FIG. 2 is an exploded perspective view of the frame components of the weight distributing trailer hitch installation and storage dolly of the illustrated embodiment of the present invention of FIG. 1.
Figure 6:
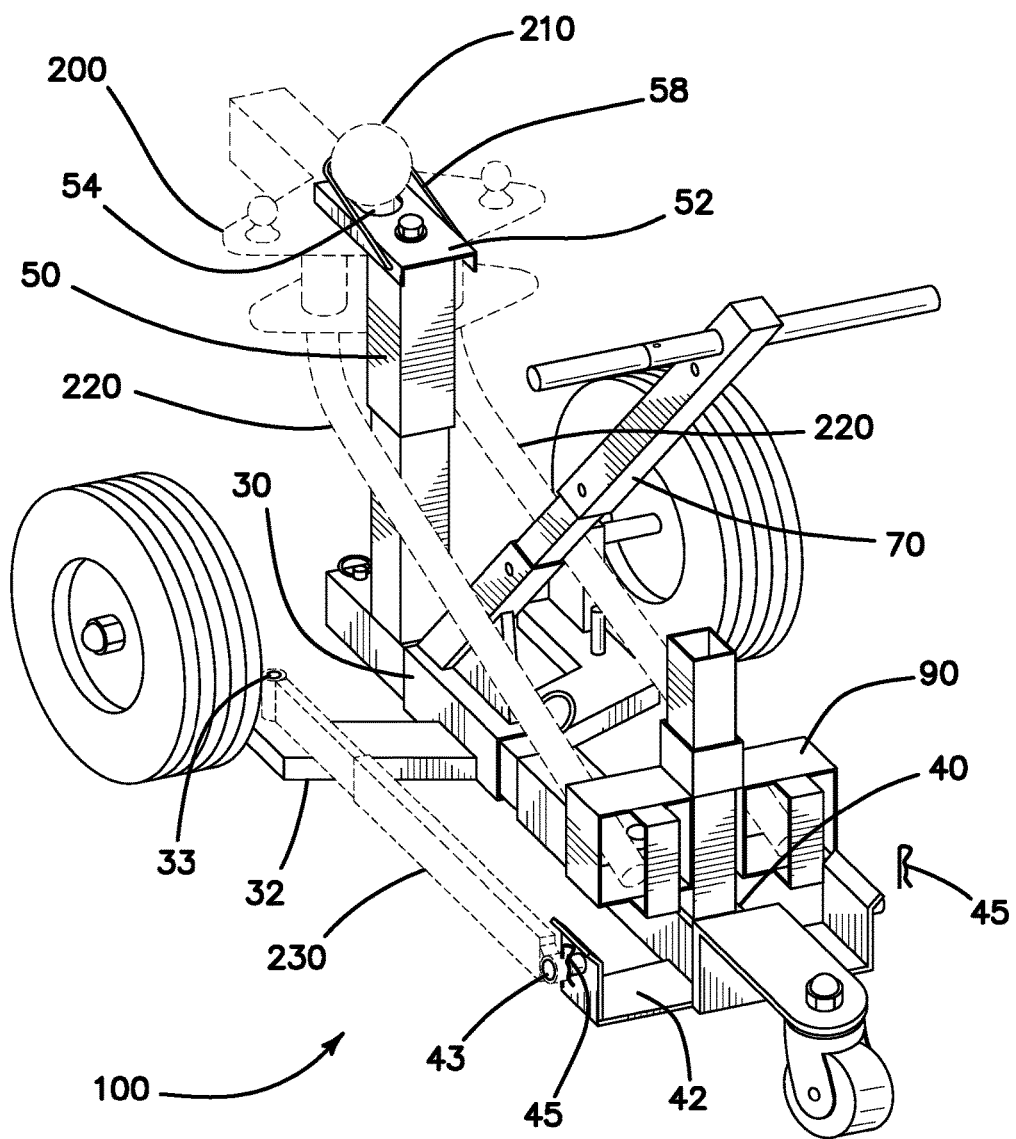
FIG. 6 is a perspective view of the weight distributing trailer hitch installation and storage dolly of the illustrated embodiment of the present invention shown engaged with a hitch-head assembly, spring bars, and one ay control brake depicted by broken lines.

FIG. 2 shows the frame of the weight distributing trailer hitch installation and storage dolly as comprised of three square hollow steel sections 20, 30 and 40. The front section 20 and the wishbone section 30 can be made as separate elements as shown in FIG. 2 or can be integrally fabricated. Once the wishbone section 30 is telescopically slid over the front section 20 and a pin 28 is inserted, they function as one rigidly connected unit. Thus, wishbone section 30 is fixed to front section 20 by means of a cotter pin 28 disposed through front section 20 and wishbone section 30. From hereon, this rigidly connected unit comprising the front section 20 and the wishbone section 30 will be assigned the reference number 10 for simplicity and clarity. The rear section 40 telescopically slides over the end of the front section 20 which passes entirely through, and protrudes from the end of wishbone section 30 as best depicted in the assembled view of FIG. 3 and is connected internally by an extension spring 38 which is attached inside to the section 20 by a pin 26 and to the rear section 40 by a bolt 48. The front section 20 and rear section 40 can thus be telescopically lengthened against the tension of extension spring 38 by holding rear section 40 in position and pushing on handle 70 to force front section 20 forward. When spring bars 220 are engaged in the stirrup 90, rearward pressure is exerted on the rear section 40 of the frame as the handle 70 is pushed forward causing counter-pressure, as best depicted in FIG. 6. When the trailer hitch-head assembly 200 is set into a tow receive (not shown) provided on the tow vehicle (not shown), and the spring bars 220 are set in the stirrup 90 a continued force exerted on handle 70 will telescope front section 20 out of rear section 40 against the spring tension of spring 38. This will allow ball 58 to clear hitch ball 210 and be rotated over it, allowing it to either engage with or disengage from hitch ball 210 depending on whether ball 58 is being rotated onto or off of hitch ball 210 respectively. As handle 70 is pulled back, spring 38 will telescope front section 20 into rear section 40 thereby shortening the length or base of wheeled dolly 100. A vertical square tube 22 extends upwardly from the front section 20 of the frame, with a female nut 24 welded into the top of the upright section 22, and is designed to receive telescopically the slotted ball receiver as best depicted in the assembled view of FIG. 1. The wishbone section 30 is comprised of two outwardly extending legs 32, one on each side, with an axel 34 extending outwardly from each leg, and a square tube 36 extending diagonally upward to receive a handle as depicted in the assembled view of FIG. 1. A vertical square tube 44 extends upwardly from the rear section 40 of the frame, and is designed to hold a stirrup as best depicted in the assembled view of FIG. 1, with the stirrup being able to rest in the extending legs 42 that extend outwardly the rear section 40 of the frame. The back end of the frame 40 terminates in bracket 46 that is drilled to receive a swivel stem caster wheel with or without a brake, as best depicted in the assembled view of FIG. 1.

Figure 3:
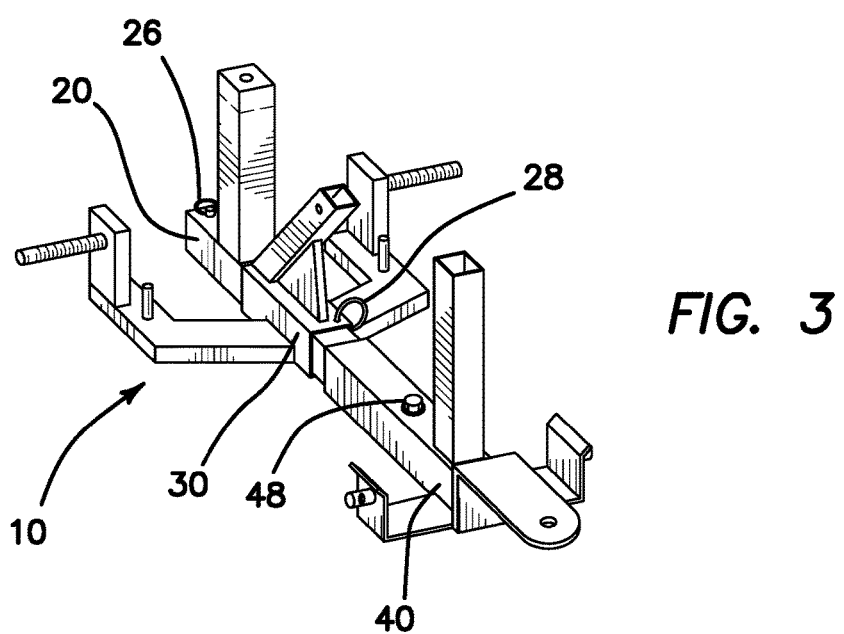
FIG. 3 is a perspective view of the assembled frame components of the weight distributing trailer hitch installation and storage dolly of FIG. 2 of the illustrated embodiment of the present invention.

FIG. 3 shows the spring loaded, telescoping frame assembly with the three square hollow steel sections 20, 30 and 40 depicted in an assembled view, with the cotter pin 28 coupling the wishbone section 30 with the front section 20, comprising the rigidly connected unit 10, and with the extension spring, as denoted by reference numeral 38 in FIG. 2, attached inside to the front section 20 by a pin 26 and to the rear section 40 by a bolt 48. The completed frame assembly incorporates numerous features as described below, which enable it to achieve its intended purpose.

Figure 4:
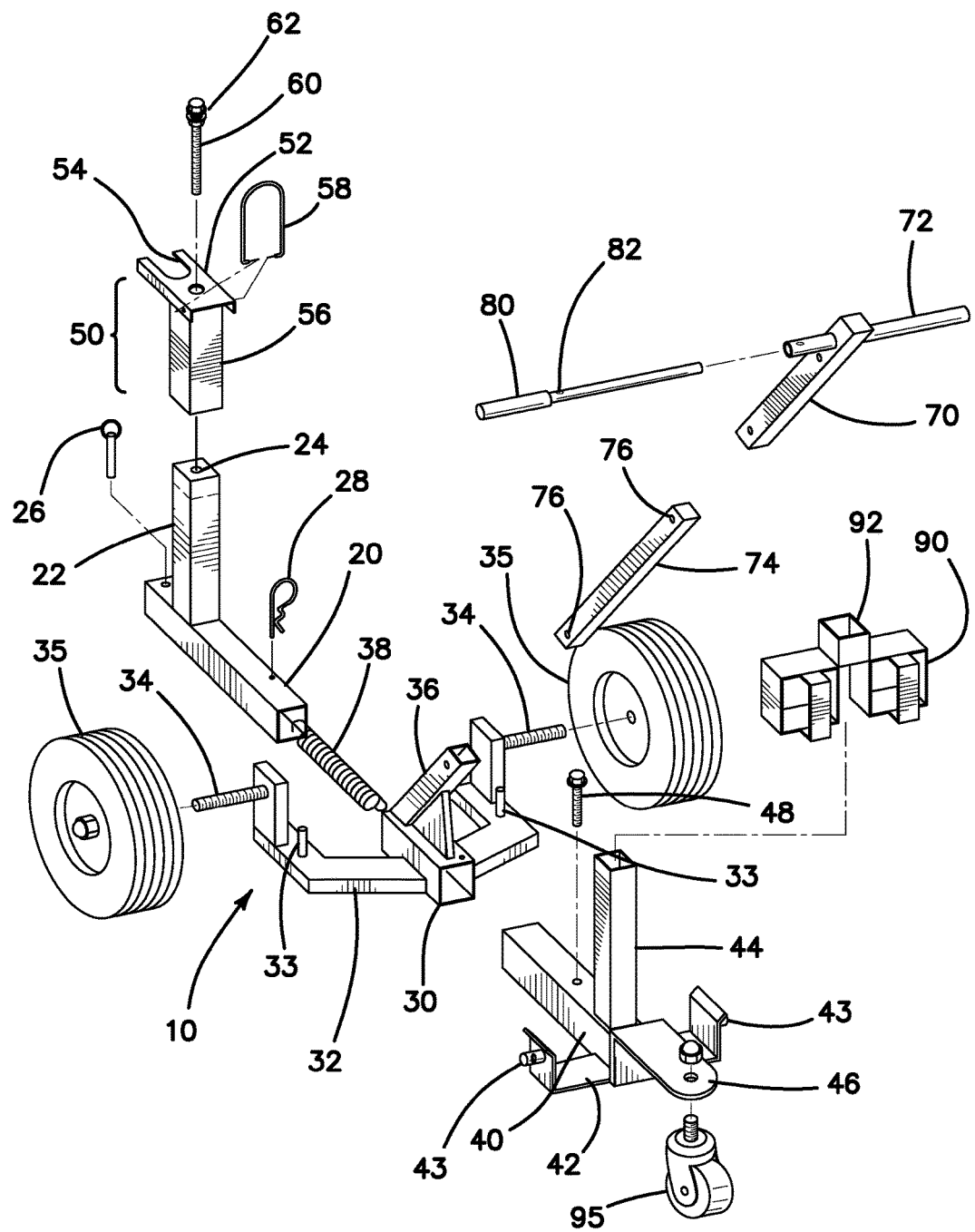
FIG. 4 is an exploded perspective vie of the weight distributing trailer hitch installation and storage dolly of the illustrated embodiment of the present invention.

FIG. 4 shows an exploded perspective view of the illustrated embodiment of the present invention as shown in assembled view in FIG. 1. The slotted ball receiver 50 includes a top plate 52 with a slot 54 designed to accept, on a horizontal plane, the stem of a hitch ball of varying size, including 2" and 2⁵⁄₁₆" diameter balls. Top plate 52 is welded to a vertical square tube 56 which telescopically slides over a forward upright section 22 of the frame 20. A ball 58 is rotatably secured to the rear of the top plate 52 and pivots forward over the hitch ball to secure it into the slot 54 of the top plate 52. A jack screw 60 passes through and engages and captures the top plate 52 between a pair of washers 62 welded or otherwise retained near the upper end of jack screw 60 as shown in FIG. 4 so that the height of the slotted ball receiver 50 is adjusted by the position of the jack screw 60. The jack screw 60 threadably engages a female nut 24 welded into the forward upright section 22 of the frame 20 forming a robust adjustment structure capable of supporting the weight of a hitch-head assembly and spring bars while being easily adjusted to various heights by rotating jack screw 60 up or down within nut 24.

The wheels 35 support the frame 10 by means of two axles 34 fixed to wishbone section 30. The handle 70 having a T-hand bar 72 also serves as a sheath for holding and storing a spring tension adjusting tool 80 retained with T-hand bar 72 by quick release button connector 82. Handle 70 includes a center section 74, which can be collapsed, extended or removed from its base 36 through the use of quick release button connectors 76 at the opposing ends of section 74. Two posts 33 are used to support the front sockets of two sway control brakes 230 as best depicted in FIG. 6. Two posts 43 are used to support the rear sockets of the two sway control brakes 230 and are grooved to accept reusable cotter pins 45 to lock the sway control brakes 230 thereto as best depicted in FIG. 6. A stirrup 90 drops over the rear upright section 44 of the frame 40, with the square tube 92 sliding over the upright section of vertical square tube 44, as best seen in assembled form in FIG. 6. The stirrup 90 contains and controls the ends of the spring bars 220 while the stirrup 90 is able to slide up and down freely to accommodate spring bars of varying sizes and angles. The stirrup 90 can slide down the upright section of vertical square tube 44 until it rests on the outwardly extending legs 42 of the frame 40. The stirrup 90 can be inverted to gain additional height. The back end of the frame 40 terminates in a bracket 46 that is drilled to receive a swivel stem caster 95 with or without a brake.

Figure 5:
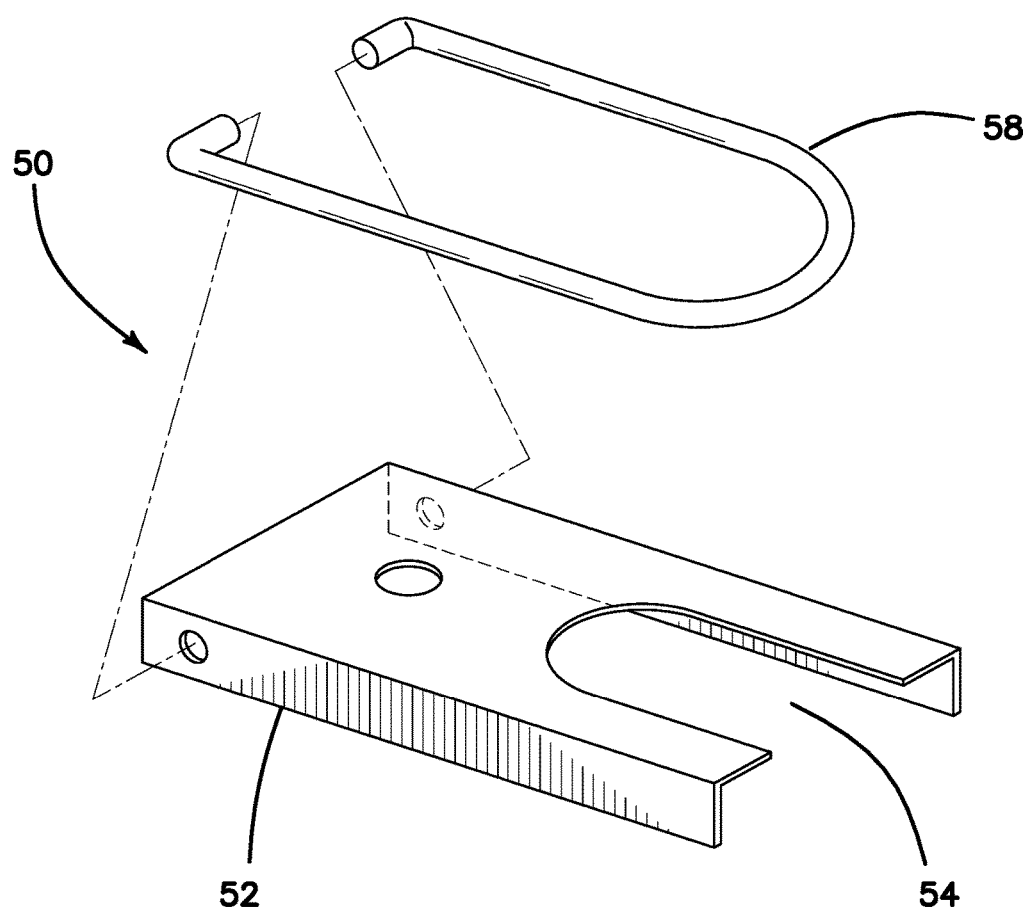
FIG. 5 is an exploded perspective view of the top plate, slot, and ball of the weight distributing trailer hitch installation and storage dolly of the illustrated embodiment of the present invention.

FIG. 5 is an exploded view which illustrates the top plate 52 with a slot 54 designed to accept, on a horizontal plane, the stem of a coupler ball of varying sizes, including 2" and 2⁵⁄₁₆" diameters. A ball 58 secured to the rear of the top plate 52 pivots forward over the coupler ball securing it into the slot 54 of the top plate 52.

FIG. 6 illustrates the weight distributing trailer hitch installation and storage dolly engaged with a hitch-head assembly 200 suspended by the coupler ball 210, spring bars 220, and one sway control brake 230 depicted with broken lines to show placement on board. The stem of the coupler ball 210 engages with the top plate 52 via the slotted receiver 54. The coupler ball 210, which is coupled to the hitch-head assembly 200, is secured to the top plate 52 by the ball 58 which pivots over the coupler ball 210. The hitch-head assembly 200 is suspended by the engaged coupler ball 210 while the spring bars 220 remain attached to the hitch-head assembly 200, the ends of the spring bars 220 being cradled by the stirrup 90. Two posts 43, which extend horizontally from the outwardly extending legs 42 of the frame 40, are used to support the rear sockets of two swab control brakes 230 and are grooved to accept reusable cotter pins 45 to lock the sway control brakes 230 thereto. Two posts 33, which extend vertically from the outwardly extending legs 32 of the wishbone section 30, are used to support the front sockets of two sway control brakes 230.

Detailed Description of Operation of the Weight Distributing Trailer Hitch Installation and Storage Dolly.

In disconnecting the trailer from the tow vehicle, the sway control brake(s) 230 are removed and placed in their positions on the posts 33,43 of the weight distributing trailer hitch installation and storage dolly 100. The spring tension adjusting tool 80 is used to release the spring bar 220 tension then returned to its position in the T-bar 72 of the weight distributing trailer hitch installation and storage dolly 100. The tow vehicle is now separated from the trailer in the normal fashion.

To remove the hitch-head assembly 200 and spring bars 220 as a single unit from the tow vehicle's receiver (not shown), the weight distributing trailer hitch installation and storage dolly 100 is rolled forward with its slotted ball receiver 50 maneuvered between the spring bars 220 and in line with the coupler ball 210. While guiding the spring bar ends 220 into the stirrup 90 on the rear upright section 44 of the frame 40, and aligning the slot 54 of the slotted ball receiver 50 with the coupler ball 210 stem, the weight distributing trailer hitch installation and storage dolly 100 is rolled forward.

The telescoping design of the frame and the internal extension spring 38 allow the rigidly connected unit 10 with the slotted ball receiver 50 to continue forward after the spring bars 220 have bottomed out in the stirrup 90, stopping the forward motion of the rear section of the frame 40. This requires a slight forward pressure on the handle 70, which is connected to the wishbone section 30 of the frame. This is necessary to overpower the tension of the internal extension spring 38 which connects the frame sections 10,40 and to allow the rigidly connected unit 10 to continue moving forward with the pressure. This spring-loaded, telescoping frame design holds the spring bars 220 snug in the stirrup 90 as the relative length of the frame to the spring bars 220 continually changes with height and angle adjustments. It also allows for variations in spring bar 220 lengths of different manufacturers or models.

When the coupler ball stem 210 bottoms out in the slot 54 of the slotted ball receiver 50, a ball 58, pivoting from the rear of the slotted ball receiver plate 52, is flipped forward over the coupler ball 210. With the spring bars 220 in the stirrup 90, and with the ball 58 flipped over the coupler ball 210, the tension of spring 38 secures and tightens the ball 58 around the stem of the coupler ball 210. With the ball 58 securing the coupler ball 210 in the slot 54 of the slotted ball receiver 50 and the spring bars 220 restrained by the stirrup 90, the weight distributing trailer hitch installation and storage dolly 100, along with the hitch-head assembly 200 and spring bars 220 can be easily and safely rolled back and separated from the tow vehicle and rolled to its storage place.

Two larger front wheels 35, supporting most of the weight, easily negotiate rough or uneven terrain while a smaller swivel stem caster 95 at the rear makes maneuvering and balancing easy. Once in place, the telescoping handle assembly 70,74 can be collapsed or removed, making parking with low overhead possible (e.g., under a work bench). The swivel stem caster 95 parking brake, if so equipped, is set and stowage of dolly 100 with weight distributing trailer hitch components 200,220,230 is complete. To install a weight distributing hitch and its component parts 200,220, 230 onto a tow vehicle using the weight distributing trailer hitch installation and storage dolly 100, the process is simply reversed.

Many alterations and modifications may be made by those having ordinary skill in the art without departing from the spirit and scope of the embodiments. Therefore, it must be understood that the illustrated embodiment has been set forth only for the purposes of example and that it should not be taken as limiting the embodiments as defined by the following embodiments and its various embodiments.

Therefore, it must be understood that the illustrated embodiment has been set forth only for the purposes of example and that it should not be taken as limiting the embodiments as defined by the following claims. For example, notwithstanding the fact that the elements of a claim are set forth below in a certain combination, it must be expressly understood that the embodiments includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the embodiments is explicitly contemplated as within the scope of the embodiments.

The words used in this specification to describe the various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting inn certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the embodiments.

We claim:

1. An adjustable, portable hitch assembly holder for handling a hitch assembly unit comprising:
    a wheeled base having a front and a rear;
    a vertically adjustable support leg extending upwardly from the front of the base, the vertically adjustable support leg having a bottom and a top;
    a hitch ball receiver extending horizontally from the top of the vertically adjustable support leg for receiving the hitch assembly unit;
    an adjustable handle extending upwardly from the base and diagonally toward the rear of the base;
    and a spring tension adjusting tool for use on the hitch assembly unit, wherein the adjustable handle has a handle bar that also serves as a sheath for holding and storing the spring tension adjusting tool.

2. The hitch assembly holder of claim 1, where the hitch assembly unit includes at least one spring bar and wherein the wheeled base includes a vertically adjustable stirrup extending upwardly from the wheeled base for receiving and positioning the spring bar of the hitch assembly unit.

3. The hitch assembly holder of claim 2, further comprising a ball and extension spring, wherein the hitch ball receiver comprises a top plate having a slot whereon the ball is pivotally coupled to the rear of the top plate, the ball rotating forward over hitch ball when the hitch ball is disposed in the slot, to retain the hitch ball in the slot of the top plate, and wherein the wheeled base is comprised of at least two telescopically coupled sections connected by the extension spring, where the two telescopically coupled sections are adjustable to accommodate different sizes of the at least one spring bar of the hitch assembly unit in the stirrup, while the extension spring allows telescopic adjustment of the two sections of the wheeled base to secure the hitch ball into the slot of the top plate by latching with the ball under spring tension.

4. The hitch assembly holder of claim 1, wherein the wheeled base includes a plurality of wheels for mobility and portability.

5. The hitch assembly holder of claim 1, wherein the vertically adjustable support leg comprises a telescopic support leg.

6. The hitch assembly holder of claim 5, wherein the telescopic support leg comprises means for raising and lowering the hitch ball receiver.

7. The hitch assembly holder of claim 5, wherein the telescopic support leg further comprises locking means for selectively fixing a vertical height of the telescopic support leg.

8. The hitch assembly holder of claim 5, wherein the telescopic support leg is comprised of at least two segments of telescopically assembled square steel tubing.

9. The hitch assembly holder of claim 1, wherein the adjustable handle comprises a telescopic handle.

10. The hitch assembly holder of claim 9, wherein the telescopic handle has a length and further comprises locking means for selectively fixing the length of the telescopic handle.

11. The hitch assembly holder of claim 1 for use in combination with a plurality of hitch balls, each hitch ball having a corresponding one of a plurality of different sizes, and each hitch ball having a corresponding stem, wherein the hitch ball receiver comprises a top plate having a front and rear with a slot defined therein to accept the corresponding stem of any one of the plurality of hitch balls.

12. The hitch assembly holder of claim 11, further comprising a ball and wherein the hitch ball receiver comprises the top plate thereon the ball is pivotally coupled to the rear of the top plate, the ball rotating forward over the hitch ball when disposed in the slot, to retain the hitch ball in the slot of the top plate.

13. The hitch assembly holder of claim 1, wherein the wheeled base further comprises two posts on the front of the wheeled base, one on either side of the wheeled base, that can support front or rear sockets of two sway control brakes, and two posts on the rear of the wheeled base, one on either side of the wheeled base, that can support front or rear sockets of two sway control brakes.

14. The hitch assembly holder of claim 1, wherein the wheeled base comprises means for extending and contracting the wheeled base to different lengths to accommodate hitch assembles of different sizes.

15. A method for using a wheeled dolly apparatus with a trailer hitch assembly having a hitch ball and a pair of spring bars with distal ends, the trailer hitch assembly for coupling to a tow receiver, comprising:
selectively adjusting a height of a hitch ball receiver on a first adjustable vertical leg of the wheeled dolly apparatus to a predetermined magnitude for installation of the trailer hitch assembly to the tow receiver;
selectively adjusting a height of a pair of stirrups on a second adjustable vertical leg of the wheeled dolly apparatus to support the distal ends of the corresponding pair of spring bars of the trailer hitch assembly;
coupling the hitch assembly to the hitch ball receiver and disposing the pair of spring bars of the trailer hitch assembly into the corresponding pair of stirrups; engaging a rotatable ball over the hitch ball of the trailer hitch ball assembly to retain the hitch ball assembly on the wheeled dolly apparatus;
installing the trailer hitch assembly onto the tow receiver by moving the wheeled dolly apparatus carrying the trailer hitch assembly toward and in alignment with the tow receiver to couple them together, thereby fixing the hitch ball assembly into a fixed location;
telescopically lengthening the wheeled dolly apparatus against an extension spring by continuing to move the wheeled dolly apparatus forward toward the tow receiver to move the hitch ball receiver and ball forward relative to the hitch ball of the trailer hitch ball assembly to allow for rotation of the ball over the hitch ball to disengage the ball from the hitch ball;
rotating the ball over the hitch ball to disengage it from the hitch ball; retracting the wheeled dolly apparatus from the tow receiver by moving it away from the tow receiver and leaving the trailer hitch assembly installed onto the tow receiver.

16. The method of claim 15 where selectively adjusting a height of a hitch ball receiver on a first adjustable vertical leg of the wheeled dolly apparatus to a predetermined magnitude for installation of the trailer hitch assembly to the tow receiver comprises making adjustments to the height of the hitch ball receiver of the wheeled dolly apparatus by turning a jack screw to raise or lower the hitch ball receiver.

17. The method of claim 15 further comprising making adjustments to the height of the handle of the wheeled dolly apparatus using a telescopic handle with quick release button connectors, which provides for greater storage capability.

18. A method for using a wheeled dolly apparatus with a trailer hitch assembly having a hitch ball and a pair of spring bars with distal ends, the trailer hitch assembly being coupled to a tow receiver, comprising:
selectively adjusting a height of a hitch ball receiver on a first adjustable vertical leg of the wheeled dolly apparatus to a predetermined magnitude for removal of the trailer hitch assembly from the tow receiver;
selectively adjusting a height of a pair of stirrups on a second adjustable vertical leg of the wheeled dolly apparatus to support the distal ends of the corresponding pair of spring bars of the trailer hitch assembly;
disposing the trailer hitch assembly coupled to the tow receiver onto the wheeled dolly apparatus by moving the wheeled dolly apparatus toward and in alignment with the trailer hitch ball assembly to couple the hitch ball of the trailer hitch ball assembly with the hitch ball receiver of the wheeled dolly apparatus and to engage the pair of spring bars with the corresponding pair of stirrups;
telescopically lengthening the wheeled dolly apparatus against an extension spring by continuing to move the wheeled dolly apparatus forward toward the tow receiver to move the hitch ball receiver and a rotatable ball forward relative to the hitch ball of the trailer hitch ball assembly to allow for rotation of the ball over the hitch ball to engage the hitch ball;
rotating the ball over the hitch ball to engage it with the hitch ball thereby coupling the trailer hitch assembly to the wheeled dolly apparatus; and retracting the wheeled dolly apparatus from the tow receiver by moving it away from the tow receiver and removing the trailer hitch assembly from the tow receiver.

19. The method of claim 18 where selectively adjusting a height of a hitch ball receiver on a first adjustable vertical leg of the wheeled dolly apparatus to a predetermined magnitude for removal of the trailer hitch assembly from the tow receiver comprises making adjustments to the height of the hitch ball receiver of the wheeled dolly apparatus by turning a jack screw to raise or lower the hitch ball receiver.

* * * * *